(12) United States Patent
Yamaga et al.

(10) Patent No.: US 7,283,457 B2
(45) Date of Patent: Oct. 16, 2007

(54) OPTICAL RECORDING MEDIUM AND METHOD OF EVALUATING OPTICAL RECORDING MEDIUM

(75) Inventors: Kenji Yamaga, Chuo-ku (JP); Hideki Hirata, Chuo-ku (JP)

(73) Assignee: TDK Corporation, Tokyo (JP)

( * ) Notice: Subject to any disclaimer, the term of this patent is extended or adjusted under 35 U.S.C. 154(b) by 577 days.

(21) Appl. No.: 10/493,420

(22) PCT Filed: Oct. 21, 2002

(86) PCT No.: PCT/JP02/10903

§ 371 (c)(1),
(2), (4) Date: Apr. 22, 2004

(87) PCT Pub. No.: WO03/042987

PCT Pub. Date: May 22, 2003

(65) Prior Publication Data
US 2004/0257970 A1 Dec. 23, 2004

(30) Foreign Application Priority Data
Oct. 24, 2001 (JP) .............................. 2001-326331

(51) Int. Cl.
*G11B 7/24* (2006.01)
(52) U.S. Cl. ................. 369/275.4; 369/275.3
(58) Field of Classification Search ............... 428/64.2, 428/64.5; 430/270.13
See application file for complete search history.

(56) References Cited

U.S. PATENT DOCUMENTS 4,988,194 A * 1/1991 Hara et al. ............... 356/243.1
5,914,926 A * 6/1999 Maeno et al. ............ 369/53.35
2001/0012249 A1* 8/2001 Fukamachi ............... 369/44.28
2002/0012315 A1* 1/2002 Iida et al. ................. 369/275.1
2002/0060979 A1* 5/2002 Tsukuda et al. .......... 369/275.4

FOREIGN PATENT DOCUMENTS

| JP | A 60-76028 | 4/1985 |
|----|------------|--------|
| JP | A 61-216139 | 9/1986 |
| JP | A 62-117151 | 5/1987 |
| JP | A 6-68474 | 3/1994 |
| JP | Y2 6-21108 | 6/1994 |
| JP | A 06-236581 | 8/1994 |
| JP | Y2 8-7536 | 3/1996 |
| JP | 2524326 | 5/1996 |

* cited by examiner

*Primary Examiner*—Thang V. Tran
*Assistant Examiner*—Abdukader Muhammed
(74) *Attorney, Agent, or Firm*—Oliff & Berridge, PLC

(57) ABSTRACT

A conventional mechanical precision measuring device is used effectively in the measurement of the eccentricity of a high density optical disc. A DVR optical disc 2 comprises a pattern 4 of fine depressions and protrusions conformed to the intended format of the disc (a first depressions and protrusions: pits and/or grooves) formed within an information recording area 6 of the disc, as well as a pattern 8 of fine depressions and protrusions for measuring the eccentricity (a second depressions and protrusions), which is formed in an area other than the information recording area 6, and is formed in accordance with a CD format having lower recording density than that of the format defined for the DVR optical disc 2. By using this pattern 8 of fine depressions and protrusions for mechanical detection, conventional mechanical precision measuring devices designed for the CD family can be used as it is, for measuring the eccentricity (mechanical precision) of the DVR optical disc 2.

17 Claims, 1 Drawing Sheet

OPTICAL RECORDING MEDIUM AND METHOD OF EVALUATING OPTICAL RECORDING MEDIUM

This Application is a 371 of PCT/JP02/10903 filed Oct. 21, 2002.

TECHNICAL FIELD

The present invention relates to an optical recording medium, and more particularly to an optical recording medium capable of recording and playback using an optical system that uses a blue laser, and a method of evaluating the mechanical precision thereof.

In this description, the term optical recording medium (optical disc) includes not only completed optical recording media (optical discs), but also semi-completed disc substrates.

BACKGROUND ART

Optical discs such as CD, MD, and DVD comprise an information recording area formed from a pattern of fine depressions and protrusions (pits and/or grooves), which are formed in accordance with a predetermined format defined for each disc.

In order to measure the degree of eccentricity relative to the center of rotation for this optical disc pattern of fine depressions and protrusions, conventionally a mechanical precision measuring device such as an eccentricity measuring device or an axial displacement measuring device has been used.

A variety of mechanical precision measuring devices have been proposed.

It is a known representative structure in which a laser beam is irradiated through an objective lens that can be driven by an actuator, on the fine depressions and protrusions of the optical disc. In the structure, the laser beam tracks the depressions and protrusions, so that the movement (the degree of displacement) of the objective lens, which reflects the displacement in a radial direction (the eccentricity) of the fine depressions and protrusions, is detected as a fluctuation in the beam spot position on an optical position sensor (for example, see Japanese Patent Laid-Open Publication No. 1987-117151).

In recent years, optical discs capable of recording and playback using optical systems that use blue lasers have been proposed, including the DVR system which uses an optical system with laser light of wavelength 405 nm, and a NA value of 0.85.

However, conventional mechanical precision measuring devices used for CD or DVD discs have been produced on the basis of CD or DVD format properties (for example, a laser light wavelength $\lambda$ of 780 nm, a numerical aperture NA=0.45, and a groove pitch of 1.6 μm in the case of CD, and 650 nm, NA=0.6, and a groove pitch of 0.74 nm in the case of DVD). Therefore, if the groove pitch of the pattern of fine depressions and protrusions is reduced to 500 nm or less for example, then the pattern becomes difficult to track so that these conventional devices cannot be adopted as measuring devices for DVR.

Of course, the eccentricity of these types of high density optical discs can be measured by using a DVR (higher performance) mechanical precision measuring device having similar structure to that for CD or DVD.

However, these types of mechanical precision measuring devices are generally expensive, even for CD media. Products for DVR media are even more expensive. If a new device is required for each new format, then large costs are unavoidable. Moreover, another problem arises in that if a new measuring device is purchased, the existing mechanical precision measuring devices used for measuring CD or DVD serve as a surplus.

On the other hand, the measurement and evaluation of optical disc eccentricity by inspection under a microscope, not by measurement with a mechanical precision measuring device, has also been frequently performed. However, even in these microscope measurement methods, when the groove pitch of the pattern of fine depressions and protrusions is reduced to 500 nm or less, the required light diffraction phenomenon is hard to be obtained so that the measurement itself becomes more difficult.

DISCLOSURE OF THE INVENTION

The present invention aims to resolve these conventional problems, with an object of providing an optical disc or an eccentricity measuring system, which enables conventional mechanical precision measuring devices to be effectively used as it is, in the measurement of the mechanical precision such as the eccentricity of an optical disc conformed to a high density format, and also enables conventional eccentricity inspection and the like using a microscope.

The present invention is able to achieve the above object by proposing an optical disc according to a construction (1) described below.

(1) An optical recording medium having grooves and/or pits as a first depressions and protrusions, of which width is equal to or less than 200 nm, in a main information recording area, the optical recording medium comprising grooves and/or lands as a second depressions and protrusions in a predetermined position other than the main information recording area, the grooves and/or lands as the second depressions and protrusions being able to be tracked by an optical system in which a laser wavelength thereof is 780±10 nm, and a numerical aperture NA of the recording and playback lens of is 0.45±0.01.

The groove widths listed in this description all refer to half widths.

With the present invention, it is noticed that as long as two formats described above are either formed consecutively or formed within a single process (the same disc setting), the precision required in relation to the optical disc eccentricity (the mechanical precision) does not change significantly, even if the optical disc format is changed.

Based on this finding, rather than simply purchasing new high performance mechanical precision measuring devices designed to measure higher density optical discs, the present invention employs the reverse thinking, and adjusts the specifications of the optical disc being prepared so as to be applied to mechanical precision measuring devices which are conventionally used.

An optical disc according to the present invention comprises a pattern of fine depressions and protrusions (pits and/or grooves) conformed to the intended format of the optical disc, formed within an information recording area of the disc, as well as a pattern of fine depressions and protrusions for mechanical detection, which is formed in an area other than the information recording area, and is formed in accordance with a format with a lower recording density (a wider groove width and a larger groove pitch) than that of the defined format of the optical disc.

As a result, when a high density optical disc such as a so-called DVR disc is produced, by using this pattern of fine depressions and protrusions for mechanical detection, conventional mechanical precision measuring devices developed for the CD or DVD families can be used without modification.

In other words, the eccentricity of a wide variety of optical discs with different track shapes (including properties such as the pitch, width or depth of the pits and/or grooves) can be measured using a single mechanical precision measuring device.

The pattern of fine depressions and protrusions formed in an area other than the information recording area can be inspected by microscope, by making the specification into CD level, since the pitch can be set at a level which enables to recognize a clear light diffraction phenomenon. Accordingly, even in those situations in which even a mechanical precision measuring device developed for the CD family of discs cannot be purchased, if only a microscope is available, eccentricity can still be measured in a conventional manner.

The following types of structures could be envisaged as variations of the present invention. Details of these variations are given below.

(2) The optical recording medium according to claim 1, wherein a groove pitch of the first depressions and protrusions is equal to or less than 500 nm.

(3) The optical recording medium according to claim 1 or 2, wherein a groove width of the second depressions and protrusions is within a range from 400 nm to 600 nm, and a groove pitch is within a range from 1.2 µm to 2.0 µm.

(4) The optical recording medium according to any one of claims 1 to 3, wherein the first depressions and protrusions can be recorded to, and/or played back from using an optical system in which a laser wavelength thereof is 450 nm or less, and a numerical aperture NA for the recording and playback lens is 0.7 or more.

(5) An optical recording medium having grooves and/or pits as a first depressions and protrusions, of which width is equal to or less than 200 nm, in a main information recording area, the optical recording medium comprising grooves and/or lands as a second depressions and protrusions in a predetermined position other than the main information recording area, the grooves and/or lands as the second depressions and protrusions being able to be tracked by an optical system in which a laser wavelength thereof is 640±20 nm, and a numerical aperture NA of the recording and playback lens is 0.6±0.01.

(6) 6. The optical recording medium according to claim 5, wherein a groove pitch of the first section of depressions and protrusions is equal to or less than 500 nm.

(7) The optical recording medium according to claim 5 or 6, wherein a groove width of the second section of depressions and protrusions is within a range from 250 nm to 750 nm, and a groove pitch is within a range from 0.6 µm to 1.5 µm.

(8) The optical recording medium according to any one of claims 5 to 7, wherein the first section of depressions and protrusions can be recorded to, and/or played back from using an optical system in which a laser wavelength thereof is 450 nm or less, and a numerical aperture NA for the recording and playback lens is 0.7 or more.

(9) A method of evaluating an optical recording medium, for evaluating mechanical precision of grooves and/or pits of a first section of depressions and protrusions, which functions as a main information recording area and can be recorded to, and/or played back from using an optical system with a laser wavelength of 450 nm or less, and a numerical aperture NA for the recording and playback lens of 0.7 or more, wherein a second section of depressions and protrusions, which is provided in a predetermined position outside the information recording area, and can be tracked by any one of an optical system with a laser wavelength of 780±10 nm, and a numerical aperture NA of the recording and playback lens of 0.45±0.01, and an optical system with a laser wavelength of 640±20 nm, and a numerical aperture NA of the recording and playback lens of 0.6±0.01, is formed either concurrently or consecutively with the first section of depressions and protrusions, and the mechanical precision of the first section of depressions and protrusions is evaluated by examining the second section of depressions and protrusions.

BEST MODE FOR CARRYING OUT THE INVENTION

Hereinafter, an embodiment of the present invention will be described in detail with reference to the accompanying drawings.

The optical disc eccentricity measuring system according to this embodiment applies the present invention to enable the eccentricity (mechanical precision) of a DVR optical disc to be measured using a mechanical precision measuring device developed for CD discs.

Figure 1:
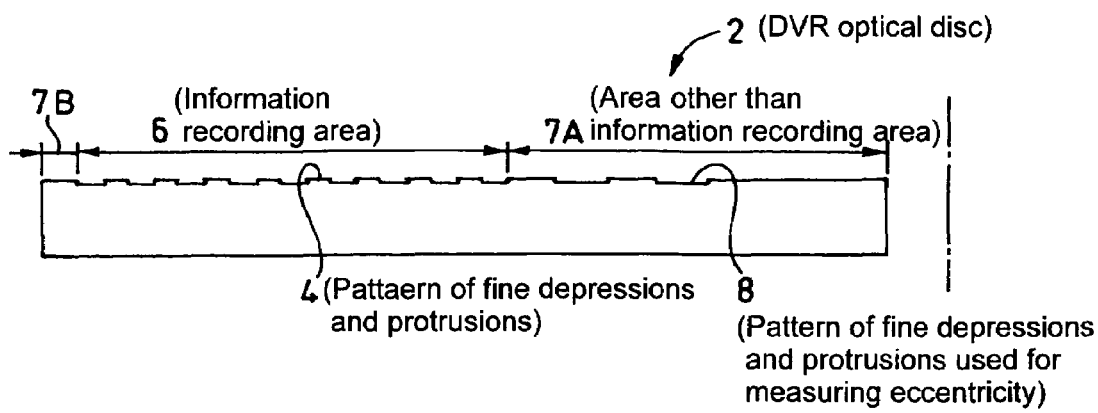
FIG. 1 is a cross-sectional view showing a schematic illustration of a DVR optical disc used with an optical disc mechanical precision measuring system of the present invention.

FIG. 1 shows a schematic illustration of a DVR optical disc substrate used with the present embodiment.

This DVR optical disc 2 comprises an information recording area 6 in which a pattern 4 of fine depressions and protrusions (a first depressions and protrusions) is formed. In the case of this embodiment, this pattern 4 of fine depressions and protrusions within the information recording area 6 is formed only from grooves, with a depth of 20 to 50 nm, a width of 100 to 200 nm, and a radial pitch (groove pitch) of 200 to 400 nm. These values are conformed to the newly proposed discs known as DVR.

On the other hand, in this embodiment, grooves comprising a pattern 8 of fine depressions and protrusions used for measuring the eccentricity (a second depressions and protrusions) are formed spirally within an inner peripheral area 7A of the area 7 other than the information recording area 6. This pattern 8 of fine depressions and protrusions used for measuring the eccentricity is formed during the same process used for forming the pattern 4 of fine depressions and protrusions of the information recording area 6, that is, during a single disc setting. Because the depth of the grooves is dependent on the thickness of the photoresist, the pattern 8 has a similar depth to that of the grooves described above, whereas the width is from 400 to 1000 nm, and the radial pitch (groove pitch) is from 1.2 to 2.0 µm. These values are conformed to the CD format.

The pattern 8 need not necessarily be formed in a spiral shape, and may also be formed concentrically, so that the pattern of fine depressions and protrusions used for measuring the eccentricity may be formed concentrically with the information recording area 6. Regardless of the configuration adopted, the level of error settles within a range that can be effectively ignored. Furthermore, these pattern 8 may also be formed in an outer peripheral area 7B instead of the inner peripheral area 7A.

Figure 2:
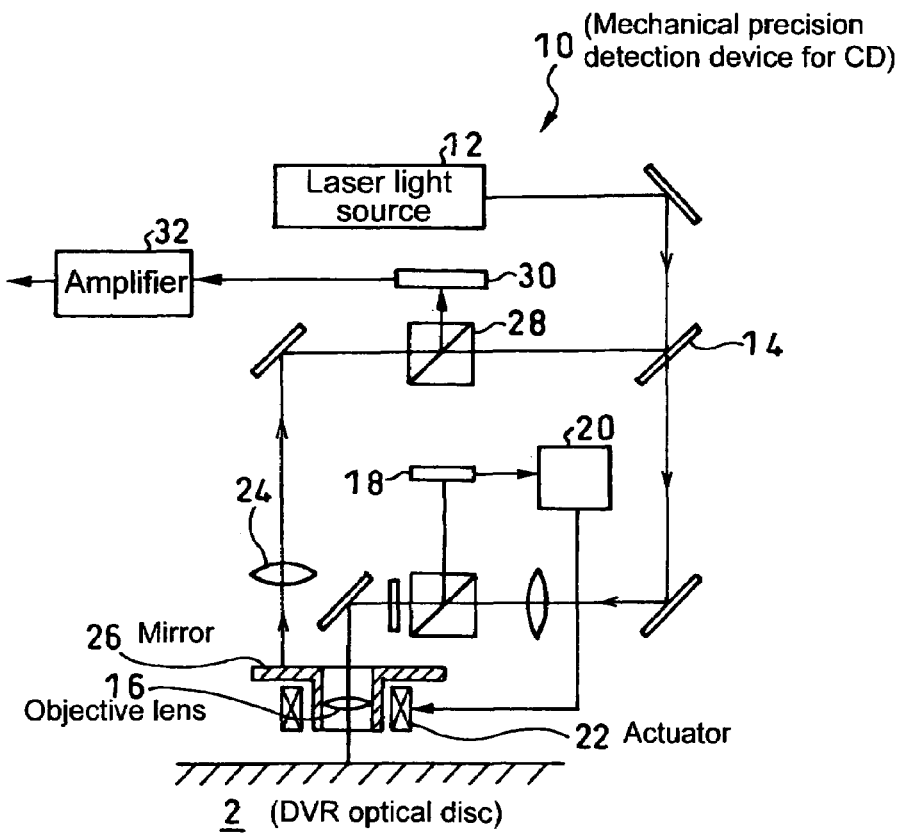
FIG. 2 is a schematic structural diagram of a mechanical precision measuring device used in the above measuring system.

FIG. 2 shows a schematic illustration of the structure of a CD mechanical precision measuring device 10 used in the eccentricity measuring system according to this embodiment.

This CD mechanical precision measuring device 10 is already known. In other words, it is one of the important characteristics of the present embodiment wherein a conventionally known CD mechanical precision measuring device 10 can be used as it is, for measuring the eccentricity of the DVR optical disc 2. The CD mechanical precision measuring device 10 is the type of device that is already widely used in the industry, and because the mechanical precision measuring device to be used in the present invention is not restricted to a device of this construction, the description below focuses mainly on the functions of the device.

This CD mechanical precision measuring device 10 comprises a laser beam source 12 for generating a laser beam with a wavelength of 780 nm, in accordance with the CD format. The laser beam irradiated from this laser beam source 12 is split into two directions by a spectroscope 14.

One of the split laser beams passes through an objective lens 16, and irradiates the pattern 8 of fine depressions and protrusions used for measuring the eccentricity, formed on the inner peripheral side 7A of the information recording area 6 of the DVR optical disc 2. The reflected light from the pattern 8 of fine depressions and protrusions used for measuring the eccentricity is detected by a photodetector 18, and a focus and tracking control circuit 20 then drives an actuator 22 based on this detection information. By driving this actuator 22, the objective lens 16 is moved so that the laser beam tracks the pattern 8 of fine depressions and protrusions used for measuring the eccentricity.

The laser beam is irradiated not onto the pattern 4 of fine depressions and protrusions within the actual information recording area 6, but onto the pattern 8 of fine depressions and protrusions used for measuring the eccentricity, which is formed on the inner peripheral side 7A of the information recording area 6 in accordance with CD format properties. Therefore, no problems arise in tracking the pattern with the performance provided by the CD mechanical precision measuring device 10.

On the other hand, the other split laser beam is irradiated onto a mirror 26 via a fixed lens 24. This mirror 26 is integrated with the objective lens 16, and follows the radial displacement of the pattern 8 of fine depressions and protrusions used for measuring the eccentricity. The reflected beam from the mirror 26 passes through a beam splitter 28 and reaches an optical position sensor 30.

As the direction of the reflected beam from the mirror 26 changes, the beam spot position on this optical position sensor 30 also changes. The direction of the reflected beam from the mirror 26 is linked with the movement of the objective lens 16, that is, the radial displacement of the pattern 8 of fine depressions and protrusions used for measuring the eccentricity. Namely, the direction of the reflected beam corresponds to the state of eccentricity for the DVR optical disc 2. Accordingly, by detecting fluctuations in the beam spot position on the optical position sensor 30, the state of eccentricity for the DVR optical disc 2 can be determined.

The output from the optical position sensor 30 is amplified by an amplifier 32, and output as "eccentricity information". As a result, the state of eccentricity of the DVR optical disc 2 can be measured using the CD mechanical precision measuring device 10.

EXAMPLE 1

A stamper was prepared. The stamper comprised grooves with a depth of 30 nm, a width of 160 nm, and a radial groove pitch of 0.3 µm, in accordance with the properties of the newly proposed discs known as DVR, which was formed as the pattern of fine depressions and protrusions of the information recording area (the first depressions and protrusions). The stamper also comprised grooves with a depth of 30 nm, a width of 500 nm, and a radial groove pitch of 1.6 µm, in accordance with the properties required for the CD format, on the inner peripheral side of the information recording area for measuring the eccentricity (the second depressions and protrusions).

A two beam cutting machine was used to form the first depressions and protrusions from the inner periphery to the outer periphery, and then, the cutting machine was returned to the innermost position to form the second depressions and protrusions.

The stamper was mounted in a die assembly of an injection molding machine in order to mold a resin substrate with an outer diameter of 120 mm, and a thickness of 1.2 mm (which belongs to the broad classification of optical discs according to the present invention).

The resin used was polycarbonate H4000-N282, manufactured by Mitsubishi Engineering-Plastics Corporation. The main molding conditions included a resin melt temperature of 360° C., a mold temperature of 125° C., and a mold clamping force of 35 tons.

When this resin substrate was measured by using a CD mechanical precision measuring device described above (LM1200, manufactured by Ono Sokki Co., Ltd., wavelength of laser beam 780 nm, numerical aperture NA 0.45), the groove surface formed in the information recording area could be focused on, but could not be tracked on the radial direction, resulting measurement of the eccentricity was impossible.

In contrast, as to the grooves formed in accordance with the CD format on the inner peripheral side of the resin substrate other than the information recording area, both focus-on and radial tracking (track-on) were possible, so that eccentricity could be measured with no problems.

From these results, it is evident that by forming a pattern of fine depressions and protrusions conformed to the CD format on an area of a DVR optical disc other than the information recording area, the eccentricity of the DVR optical disc can be measured by using a mechanical precision measuring device developed for CD.

EXAMPLE 2

Using the resin substrate of the example 1, the eccentricity thereof was measured by microscope inspection. As a result, the boundary lines between the information recording area (the first depressions and protrusions) and the mirrored area were difficult to be detected by the microscope, so that measurement of the eccentricity was impossible. However, the boundary lines between the pattern of fine depressions and protrusions for measuring the eccentricity (the second depressions and protrusions), formed other than the information recording area and the mirrored area were able to be detected even by microscope, so that the eccentricity could be measured easily.

From these results, it is evident that regardless of the format of the pattern of fine depressions and protrusions formed within the information recording area, as long as a pattern of fine depressions and protrusions for measuring the eccentricity having a pitch of the CD format level is formed on an area other than the information recording area, measurement of the eccentricity is also possible using a microscope in a conventional manner.

Hence it is clear that even for an optical disc in the DVR level (an optical recording medium in which the width of grooves and/or pits in a first depressions and protrusions which functions as the main information recording area is equal to or less than 200 nm), if either a second depressions and protrusions of the CD level (a level in which the width of the grooves is at least 400 nm but no more than 1000 nm, and the groove pitch is at least 1.2 μm but no more than 2.0 μm), or a second depressions and protrusions of the DVD level (a level in which the width of the grooves is at least 250 nm but no more than 750 nm, and the groove pitch is at least 0.6 μm but no more than 1.5 μm), is provided in a position either on the inner periphery or the outer periphery of the disc (a predetermined position other than the information recording area), then, the mechanical precision of the disc can be satisfactorily measured and evaluated by either a mechanical precision measuring device designed for CD or a mechanical precision measuring device designed for DVD.

In other words, it is clear that even though the optical disc itself is surely of the DVR level, with a groove pitch of 500 nm or less, and has properties which mean that recording and/or playback can only be conducted with an optical system with a laser wavelength of 450 nm or less, and a numerical aperture NA for the recording and playback lens of 0.7 or more, the mechanical precision of the disc can still be satisfactorily measured and evaluated using either a mechanical precision measuring device designed for CD or a mechanical precision measuring device designed for DVD.

The CD mechanical precision measuring device 10 described in the above embodiment merely represents one possible example, and in the present invention, there are no particular restrictions on the construction of the mechanical precision measuring device. Specifically, any CD or DVD mechanical precision measuring device that has been proposed, or is commercially available, can be used, and if new CD or DVD mechanical precision measuring devices, such as low cost devices, are developed in the future, these would also be applicable to the present invention.

INDUSTRIAL APPLICABILITY

According to the present invention, a conventional mechanical precision measuring device can be effectively used, as it is, in the measurement of the mechanical precision of an optical disc with a high density format.

The invention claimed is:

1. An optical recording medium including a layer with grooves and/or pits as a first depressions and protrusions, of which width is equal to or less than 200 nm, in a main information recording area; and said optical recording medium also including, in the same layer as the first depressions and protrusions, grooves and/or lands as a second depressions and protrusions in an inner or outer peripheral area with respect to the main information recording area, the grooves and/or lands as the second depressions and protrusions being able to be tracked by an optical system in which a laser wavelength thereof is 780±10 nm, and a numerical aperture NA of the recording and playback lens of is 0.45±0.01, and wherein the grooves and/or lands as the second depressions and protrusions are configured to indicate mechanical precision information of the optical recording medium when the optical recording medium is evaluated by a mechanical precision measuring device.

2. The optical recording medium according to claim 1, wherein a groove pitch of the first depressions and protrusions is equal to or less than 500 nm.

3. The optical recording medium according to claim 1, wherein a groove width of the second depressions and protrusions is within a range from 400 nm to 600 nm, and a groove pitch is within a range from 1.2 μm to 2.0 μm.

4. The optical recording medium according to claim 1, wherein the first depressions and protrusions can be recorded to, and/or played back from using an optical system in which a laser wavelength thereof is 450 nm or less, and a numerical aperture NA for the recording and playback lens is 0.7 or more.

5. An optical recording medium including a layer with grooves and/or pits as a first depressions and protrusions, of which width is equal to or less than 200 nm, in a main information recording area; and said optical recording medium also including, in the same layer as the first depressions and protrusions. grooves and/or lands as a second depressions and protrusions in an inner or outer peripheral area with respect to the main information recording area, the grooves and/or lands as the second depressions and protrusions being able to be tracked by an optical system in which a laser wavelength thereof is 640±20 nm, and a numerical aperture NA of the recording and playback lens is 0.6±0.01, and wherein the grooves and/or lands as the second depressions and protrusions are configured to indicate mechanical precision information of the optical recording medium when the optical recording medium is evaluated by a mechanical precision measuring device.

6. The optical recording medium according to claim 5, wherein a groove pitch of the first section of depressions and protrusions is equal to or less than 500 nm.

7. The optical recording medium according to claim 5, wherein a groove width of the second section of depressions and protrusions is within a range from 250 nm to 750 nm, and a groove pitch is within a range from 0.6 μm to 1.5 μm.

8. The optical recording medium according to claim 5, wherein the first section of depressions and protrusions can be recorded to, and/or played back from using an optical system in which a laser wavelength thereof is 450 nm or less, and a numerical aperture NA for the recording and playback lens is 0.7 or more.

9. A method of evaluating an optical recording medium which includes grooves and/or pits as a first depressions and protrusions formed in an area of a layer of the optical recording medium which functions as a main information recording area and can be recorded to, and/or played back from using an optical system in which a laser wavelength thereof is 450 nm or less, and a numerical aperture NA for the recording and playback lens is 0.7 or more, and a second depressions and protrusions formed in an inner or outer peripheral area with respect to the main information recording area in the same layer as the first depressions and protrusions, where the second depressions and protrusions can be tracked by any one of an optical system in which a laser wavelength thereof is 780±10 nm, and a numerical aperture NA of the recording and playback lens is 0.45±0.01, and an optical system in which a laser wavelength thereof is 640±20 nm, and a numerical aperture NA of the recording and playback lens of 0.6±0.01, is formed either concurrently or consecutively with the first depressions and protrusions, wherein the method comprises evaluating the mechanical precision of the first depressions and protrusions by examining the second depressions and protrusions.

10. The optical recording medium according to claim 2, wherein a groove width of the second depressions and protrusions is within a range from 400 nm to 600 nm, and a groove pitch is within a range from 1.2 μm to 2.0 μm.

11. The optical recording medium according to claim 2, wherein the first depressions and protrusions can be recorded to, and/or played back from using an optical system in which a laser wavelength thereof is 450 nm or less, and a numerical aperture NA for the recording and playback lens is 0.7 or more.

12. The optical recording medium according to claim 3, wherein the first depressions and protrusions can be recorded to, and/or played back from using an optical system in which a laser wavelength thereof is 450 nm or less, and a numerical aperture NA for the recording and playback lens is 0.7 or more.

13. The optical recording medium according to claim 6, wherein a groove width of the second section of depressions and protrusions is within a range from 250 nm to 750 nm, and a groove pitch is within a range from 0.6 μm to 1.5 μm.

14. The optical recording medium according to claim 6, wherein the first section of depressions and protrusions can be recorded to, and/or played back from using an optical system in which a laser wavelength thereof is 450 nm or less, and a numerical aperture NA for the recording and playback lens is 0.7 or more.

15. The optical recording medium according to claim 7, wherein the first section of depressions and protrusions can be recorded to, and/or played back from using an optical system in which a laser wavelength thereof is 450 nm or less, and a numerical aperture NA for the recording and playback lens is 0.7 or more.

16. The optical recording medium according to claim 1, wherein the mechanical precision information includes a degree of eccentricity of at least the first depressions and protrusions.

17. The optical recording medium according to claim 5, wherein the mechanical precision information includes a degree of eccentricity of at least the first depressions and protrusions.

* * * * *